(12) United States Patent
Bertini et al.

(10) Patent No.: US 12,413,168 B1
(45) Date of Patent: *Sep. 9, 2025

(54) MULTIPLE OUTPUT POWER SUPPLY FOR A MOVABLE BARRIER OPERATOR

(71) Applicant: The Chamberlain Group LLC, Oak Brook, IL (US)

(72) Inventors: Anthony David Bertini, Chicago, IL (US); Edwin Fernelly Moreno Hortz, West Chicago, IL (US); James Scott Murray, West Chicago, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,545

(22) Filed: Mar. 5, 2024

Related U.S. Application Data

(63) Continuation of application No. 17/130,345, filed on Dec. 22, 2020, now Pat. No. 11,955,913.

(51) Int. Cl.
| | |
|---|---|
| *H02P 27/04* | (2016.01) |
| *E05F 15/668* | (2015.01) |
| *H02P 7/03* | (2016.01) |
| *H02P 29/024* | (2016.01) |

(52) U.S. Cl.
CPC .......... *H02P 27/04* (2013.01); *E05F 15/668* (2015.01); *H02P 7/03* (2016.02); *H02P 29/0241* (2016.02); *E05Y 2201/434* (2013.01); *E05Y 2400/61* (2013.01); *E05Y 2900/106* (2013.01)

(58) Field of Classification Search
CPC .... E05F 15/668; H02P 27/04; H02P 29/0241; H02P 29/024; H02P 7/03
See application file for complete search history.

(56) References Cited

U.S. PATENT DOCUMENTS

| | | | | |
|---|---|---|---|---|
| 10,731,397 | B2 * | 8/2020 | Tsui | E05F 15/681 |
| 11,187,026 | B2 * | 11/2021 | Cate | E05F 15/77 |
| 11,261,648 | B2 * | 3/2022 | Axtolis | E05F 15/41 |
| 11,574,512 | B2 * | 2/2023 | Morris | E05F 15/77 |
| 11,955,913 | B1 * | 4/2024 | Bertini | H02P 29/0241 |

* cited by examiner

*Primary Examiner* — Thai T Dinh
(74) *Attorney, Agent, or Firm* — Dority & Manning, P.A.

(57) ABSTRACT

In one aspect, a movable barrier operator system is provided that includes a motor configured to be coupled to a movable barrier. The motor has a power rating indicative of a minimum power to be supplied to the motor in order for the motor to move the movable barrier. The system further includes an external power supply configured to connect to an electrical outlet. The external power supply has a plurality of outputs each having a power rating indicative of a maximum power the output supplies, the output power rating being less than the motor power rating. The movable barrier operator system includes combiner circuitry configured to combine power from the outputs of the external power supply and provide the combined power to the motor. The system further includes a monitoring circuit configured to detect a fault condition of any of the outputs of the external power supply.

20 Claims, 7 Drawing Sheets

MULTIPLE OUTPUT POWER SUPPLY FOR A MOVABLE BARRIER OPERATOR

This application is a continuation of U.S. patent application Ser. No. 17/130,345, filed Dec. 22, 2020, entitled MULTIPLE OUTPUT POWER SUPPLY FOR A MOVABLE BARRIER OPERATOR.

TECHNICAL FIELD

This disclosure relates generally to movable barrier operators, and more specifically, to power supplies for movable barrier operators, such as residential garage door openers.

BACKGROUND

A movable barrier operator (MBO) may be used to control access to areas by moving movable barriers between different positions. For example, a jackshaft-style movable barrier operator may be installed in a secured area (e.g., a warehouse or garage) to control the position of a movable door. The jackshaft operator generally includes an output shaft connected to a counterweight shaft of the movable door. The counterweight shaft is connected to a torsion spring that balances most of the weight of the door. To control the position of the door, the movable door includes drums mounted on the output shaft and a pair of cables each connected at one end to the drum and at an opposite end to the door. The jackshaft operator turns the output shaft, causing rotation of the drums to either wind up or pay out the cables from the drums and thereby move the door. Movable barrier operators, including jackshaft-style operators, may be subject to certifications, regulatory approval or restrictions related to the class of power and current (VA class ratings) that are supplied to power the movable barrier operator as well as the cabling or wiring used to connect the movable barrier operator to a power source.

The Underwriters Laboratory (UL) 325 Standard, for example, specifies a 120 Volt alternating current (AC) residential garage operator to have an AC power cord length of 6 feet or less. The National Electrical Code (NEC) further specifies that a 120 Volt AC extension cord may not be secured to a surface (e.g., a wall). In many homes or residences, there are no electrical outlets provided within 6 feet of the location of where a jackshaft-operator is mounted. As a result, to power a jackshaft operator in accordance with the UL and NEC specifications a 120 VAC outlet should be installed within the 6 feet of a planned installation location of a jackshaft operator. For those homeowners who are not handy or comfortable with a do-it-yourself (DIY) addition of a new electrical outlet and circuitry, this additional installation is expensive and can cost more than the MBO system itself. In addition, the need to engage an electrician, adds time and inconvenience to the customer and/or the installer of the jackshaft operator, making the overall system installation process more challenging.

BRIEF DESCRIPTION OF THE DRAWINGS

Disclosed herein are embodiments of systems, apparatuses, and methods pertaining to movable barrier operators, including their components, operation and installation. This description includes drawings, wherein.

Figure 1:
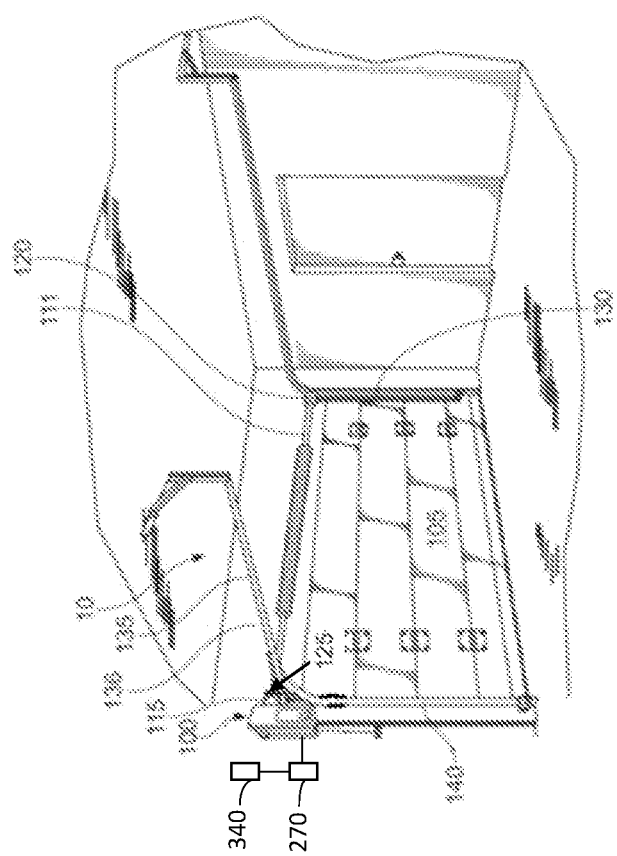
FIG. 1 is an illustration of an example movable barrier operator system within a garage.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, a movable barrier operator system is provided that includes a motor configured to be coupled to a movable barrier and move the movable barrier between open and closed positions. The motor has a power rating indicative of a recommended electrical power to be supplied to the motor in order for the motor to move the movable barrier. The system further includes an external power supply configured to connect to an electrical outlet. The external power supply has a plurality of outputs with each output of the plurality having a power rating indicative of a maximum power the individual output supplies, the individual output power rating of each output being less than the motor power rating. The movable barrier operator system includes combiner circuitry configured to combine power from the outputs of the external power supply and provide the combined power to the motor. The system further includes a monitoring circuit configured to detect a fault condition of any of the outputs of the external power supply.

The present movable barrier operator system provides enhanced flexibility during installation because, in some embodiments, the lower power rating of the outputs of the external power supply permits wiring of the outputs to be secured to a surface (e.g., ceiling or wall) where wiring having a power rating commensurate with the motor may not otherwise be specified, recommended or permitted to be secured. For example, the motor may have a NEC Class I power rating and the outputs of the external power supply include wiring having a NEC Class 2 power rating. In this manner, the outputs of the wiring may have a lower power rating such that the wiring may be secured directly (e.g., without conduit or raceway) to a wall while complying with NEC specifications since the NEC is permissive toward Class 2 wiring to be secured to a wall.

The present disclosure also provides a method of operating a movable barrier operator system including a movable barrier operator and an external power supply. The example method includes providing electrical power to the movable barrier operator via a plurality of outputs of the external power supply and monitoring each output of the external power supply for a fault. The method further includes combining the electrical power from the outputs of the external power supply at current combiner circuitry of the movable barrier operator and providing an electrical power output from the current combiner circuitry to a motor of the movable barrier operator. The combined electrical power output from the current combiner circuitry is greater than the power supplied individually by each of the outputs of the power supply. In this manner, the outputs of the external power supply combine to provide the electrical power for the movable barrier operator to move an associated movable barrier while the outputs may include wiring having a lower power rating (e.g., Class 2) than the power rating of the movable barrier operator (e.g., Class 1). The lower power rating of the outputs of the external power supply may permit more installation configurations than if the outputs were a higher power rating and subject to more particular installation recommendations.

In accordance with another aspect of the present disclosure, a method is provided for installing a movable barrier operator system. The method includes mounting a movable barrier operator to a surface of a secured area and coupling a motor of the movable barrier operator to a movable barrier. The movable barrier operator has a power rating indicative of a minimum power to be supplied to the movable barrier operator in order for the movable barrier operator to move the movable barrier. The method further includes connecting an external power supply for the movable barrier operator to an electrical outlet, the external power supply including a plurality of outputs configured to supply electrical power to the movable barrier operator, each of the outputs having a power rating indicative of a maximum power the output provides that is less than the power rating of the movable barrier operator. The method facilitates a variety of installation configurations of the movable barrier operator system due to the lower power rating of the outputs of the external power supply as discussed in greater detail below.

The present disclosure also provides systems, devices, and methods are provided herein useful to install and operate a movable barrier operator. More specifically, a multi-output external power supply is provided that allows a movable barrier system with a volt-ampere (VA) rating (e.g., Class 1) to be energized by an external power supply whose n+1 outputs (i.e., n+1 operator inputs) have a different VA rating (e.g., Class 2). Because a plurality of inputs to the operator are wired and installed, a monitoring circuit is also provided that is configured to monitor for an electrical characteristic or parameter (e.g., determine voltage and current levels of then +1 Class 2 rated inputs) of the external power supply, to assess if the operator was installed according to recommendations and/or instructions and has a suitable voltage/current supply for operation. In addition to validation of the setup and wiring during initialization, the monitoring circuit may also provide a determination of a fault condition continuously and/or at scheduled time intervals. A fault may be, for example, improper connection of one or more of the plurality of outputs of the external power supply or inputs of the movable barrier operator, excess voltage or current load on one or more of the plurality of outputs and/or inputs, and/or failure of one or more of the plurality of outputs and/or inputs.

In some embodiments, a movable barrier operator system comprises a movable barrier operator, such as a jackshaft operator, having a motor for moving a movable barrier from an open to a closed position. The system also includes an external power supply having a plurality of outputs, the external power supply configured to be coupled to the movable barrier operator for supplying a target voltage and amperage to the movable barrier operator. The system also includes a monitoring circuit for detecting faults of the external power supply and/or connections between the external power supply and the movable barrier operator. Each of the plurality of outputs of the external power supply may have a common VA rating, and the plurality of outputs are combined to supply a target voltage and/or current at a different VA rating to the operator for running the motor. A target voltage/current to power the motor may be in the range of up to 20 Volts and up to 24 Amps. A common voltage/current supplied by the outputs may be in the range of up to 20 Volts and up to 8 Amps.

In other embodiments, a method of installing a movable barrier operator system is provided. The movable barrier operator system includes a movable barrier operator, an external power supply having multiple outputs configured to be connected to the movable barrier operator, and combiner circuitry configured to combine the power from the outputs of the external power supply for use by the movable barrier operator. The method includes monitoring the system to determine if a fault condition is present. If a fault condition is present, an alert may be provided to signal or prompt an action to address the fault. The action may be predetermined or otherwise previously suggested. Such action may be based on the type of fault, and different types of alerts or alarms may be used to signal different fault conditions and may suggest the relevant appropriate action to resolve it. Once the action is performed, the system may be monitored again to check for additional faults or issues until there is a no-fault condition or state. Once no fault is detected, the movable barrier operator may be tested for overall operation, and the installation and initialization of the movable barrier operator system may be completed. Testing and completion may include, for example, mounting of any remaining components, final testing of the movement and control of the garage door, etc. Monitoring by the monitoring circuit may continue to occur subsequent to an initialization phase and may occur continuously, periodically, randomly, or regularly at scheduled intervals. If a fault is detected after the initialization phase, alternative actions may be taken. For example, an alert or alarm may be sent to a user indicating the presence of a system issue, and a backup battery may be engaged if a fault is detected in one of the plurality of outputs as one example.

In yet other embodiments, a method of operating a movable barrier operator system is provided. The method comprises providing an operator for lifting a movable barrier between an open and a closed position. The method also includes using an external power supply with a plurality of outputs having VA ratings, and supplying power to the operator at a target VA rating. The method also includes monitoring each of the plurality of outputs to determine if a fault is detected from the external power supply. The plurality of outputs are combined to supply power to the movable barrier operator where the target rating is different from the VA ratings of the outputs of the external power supply.

The embodiments herein provide a number of improvements as will become apparent from the description that follows. An advantage of one embodiment is that the operator may be installed in a location within a garage where an AC outlet (e.g., 120 V) and the movable barrier operator are not within 6 ft of each other. More specifically, the installation of a movable barrier operator may be greater than 6 feet from an AC outlet. In addition, combining a plurality of outputs having a lower VA class rating (e.g., Class 2) coming from an external power supply, enables an overall higher VA rated system (e.g., Class 1) for installation and regulatory purposes, while utilizing cabling at the lower VA class rating. As such, wires of the outputs may be fastened to a garage interior wall and/or ceiling where the wires are Class 2, even though the system is Class 1, and such Class 2 power wires may accordingly be longer than 6 feet.

With reference to FIG. 1, an example movable barrier operator system 10 is provided that includes a movable barrier operator 100, such as a garage door opener. The movable barrier operator 100 is configured to move a door of a movable barrier between open and closed positions. The movable barrier may include a door, such as a garage door 105, and components that facilitate movement of the door such as drums 115, 120 and flexible drive members such as chains or cables 125, 130. The movable barrier operator 100 may be configured to move the garage door 105 in response to commands from one or more remote controls such as portable transmitters, a keypad, an in-vehicle transmitter, a wall controller and/or portable electronic device directly or over a network.

The movable barrier operator 100 may be in the form of a jackshaft-style operator as provided in the example shown in FIG. 1. While a jackshaft-style operator is shown and used as a common example in this disclosure, the subject matter of this disclosure can be employed in other movable barrier operator systems such as garage door opener systems that use a trolley. The movable barrier operator 100 includes a motor 110 (see FIG. 2). The motor 110 has an output shaft coupled to a drive shaft 111 that may also be referred to as a torsion shaft or the jackshaft. The drums 115, 120 are mounted to the drive shaft 111 and are connected to the cables 125, 130. The motor 110 is configured to turn the drive shaft 111 and drums 115, 120 to wind the cables 125, 130 onto or pay off the cables 125, 130 from the drums 115, 120. The motor 110 may be a component of a variable speed drive of the movable barrier operator 100. The variable speed drive may permit changing of the speed of the motor 110 such as by changing the frequency of electrical power utilized by the motor 110. The motor 110 may have one or more variables associated with operation of the motor 110 such as the frequency of electrical power utilized by the motor 110, current draw of the motor 110, and/or speed of the motor 110.

As illustrated, the garage door 105 is in a closed position. When the movable barrier operator 100 receives a command to open the garage door 105, the movable barrier operator 100 operates the motor 110 to turn the drive shaft 111 and the cable drums 115, 120. The cable drums 115, 120 rotate and wind the cables 125, 130 which are connected to bottom portions of the door 105 around the cable drums 115, 120. This winding up of the cables 125, 130 causes the garage door 105 to move upward and into an open position.

Once the garage door 105 is in an open position, the garage door 105 is oriented substantially horizontally on horizontal portions 135 of tracks 136 that guide movements of the garage door 105. When the movable barrier operator 100 receives a command to move the garage door 105 to a closed position, the movable barrier operator 100 operates the motor 110 in the opposite direction. This causes the cables 125, 130 to unwind or pay out from the cable drums 115, 120, and allows the garage door 105 to move downward by gravity along vertical portions 140 of the guide tracks 136, being controllably lowered by the cables 125, 130.

Figure 2:
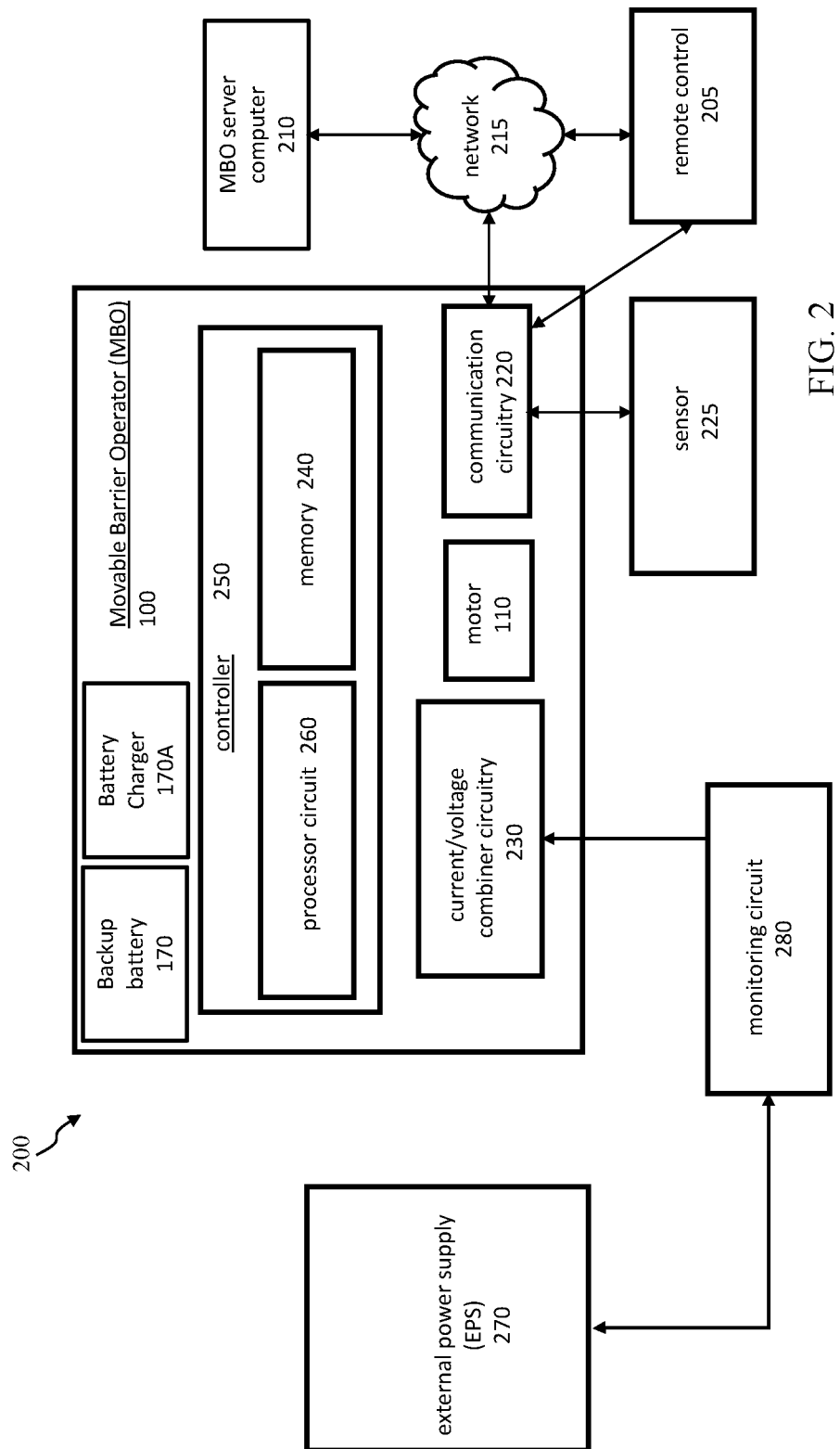
FIG. 2 is a block diagram of an example movable barrier operator system including a movable barrier operator and an external power supply.

FIG. 2 is a block diagram of an example movable barrier operator system 200, in accordance with some embodiments. The movable barrier operator system 200 includes a movable barrier operator 100, an external power supply 270, and a monitoring circuit 280. The movable barrier operator 100 may include a motor 110, a controller 250 that includes a processor or processing circuitry 260 and a memory 240. The motor 110 may be a component of a variable speed drive of the movable barrier operator 100. In an embodiment, a changing in the speed of the motor 110 may be performed by changing the frequency of electrical power utilized by the motor 110. For example, the frequency may be adjusted within the range of approximately 30 hertz to approximately 120 hertz.

The movable barrier operator 100 includes a backup battery 170 that may be utilized to power the movable barrier operator 100 if a fault is detected in one of the plurality of outputs of the external power supply 270 or when an electrical power source (e.g., an AC power outlet or line to which the external power supply 270 is coupled) is interrupted. The backup battery 170 may be rechargeable. The movable barrier operator 100 includes a battery charger 170A that receives power from the combiner circuitry 230 when the motor 110 is not being operated to charge the backup battery 170 when the backup battery is not fully charged. Once fully charged, the battery charger 170A may monitor the status of the backup battery 170 and charge the backup battery 170 as needed to maintain a predetermined amount of stored energy in the backup battery 170.

The movable barrier operator 100 also includes communication circuitry 220, which may be configured to communicate with a sensor 225 of the movable barrier operator system 200. The sensor 225 may include one or more sensors, such as an optical obstruction detector (e.g., photoeyes and/or a camera), a torque or output shaft speed (e.g., RPM) sensor associated with the motor 110, and/or a motion sensor. In addition, the movable barrier operator 100 communicates with a movable barrier operator server computer 210 over a network 215 using the communication circuitry 220. In some examples, the communication circuitry 220 may communicate door status (open, closed, moving), obstruction, and power supply information to the server computer 110 and receives state change commands from the server computer 110. The network 215 may include one or more networks, for example, a wireless access point and the internet.

The movable barrier operator 100 may be controlled by a remote control 205, such as a hand-held transmitter, an in-vehicle device, or a portable electronic device (e.g., a smartphone). The hand-held transmitter may communicate directly with the movable barrier operator 100, for example, via a 300-400 or 900 MHz radio signal. The portable electronic device 205 may additionally or alternatively communicate indirectly with the movable barrier operator 100. For example, a state change request (e.g., open or close the garage door) may be sent from the remote control device 205 to the server computer 210 over the network 215 (e.g., the internet) and the server computer 210 may communicate a state change command over the network 215 to the movable barrier operator 100.

The movable barrier operator 100 may also include combiner circuitry 230, which combines one or more of the power, the current and/or voltage of a plurality of outputs (e.g., outputs 290A-C of FIGS. 3 and 4) of the external power supply 270 into a single input for use by the movable barrier operator 100. The outputs 290A-C may include wires preassembled with the other components of the external power supply 270 such as being soldered to or otherwise integral/unitary with electrical conductors or terminals of the AC to low voltage (LV) DC circuitry 320A-C. In another embodiment, the outputs 290A-C are connectors of the external power supply 270, and an installer customizes the various conductors between movable barrier operator 100 and external power supply 270 (e.g., by cut wires to length and then connecting the wires to the connectors, or otherwise selecting certain pre-configured wires/conductors of, for example, a set or kit) during installation of the movable barrier operator system 10.

The outputs 290 may be two or more outputs, such as output 290A, 290B . . . 290N. The combiner circuitry 230 may be located within movable barrier operator 100 as illustrated. Alternatively, the combiner circuitry 230 may be provided external to the movable barrier operator 100. Each of the outputs 290A-C have a power/volt-amp (VA) rating in a first voltage/current rating category (e.g., Class 2), and are combined to supply a target voltage to the movable barrier operator 100 at a higher target voltage/current rating (e.g., Class 1). Examples of the connection and operation of an external power supply 270 according to some embodiments herein will be discussed in further detail hereinafter.

A monitoring circuit 280 may also be coupled to, or integral with, the movable barrier operator 100 for monitoring the installation and operation of the external power supply 270 and the configuration of the outputs 290A-C. More particularly, the monitoring circuit 280 may be configured to monitor and detect a fault condition in the operation or installation of the external power supply 270. A fault condition may signify the result of a complete failure of one of the outputs 290A-C or other components of the movable barrier operator 100. As another example, a detected fault condition may signify an installation miswiring, improper load sharing, a short-circuit, an open-circuit, or other persistent or intermittent problem, issue or defect in the movable barrier operator 100 or the external power supply 270. Other embodiments of the monitoring circuit will be described in further detail below with respect to FIG. 4.

Figure 3:
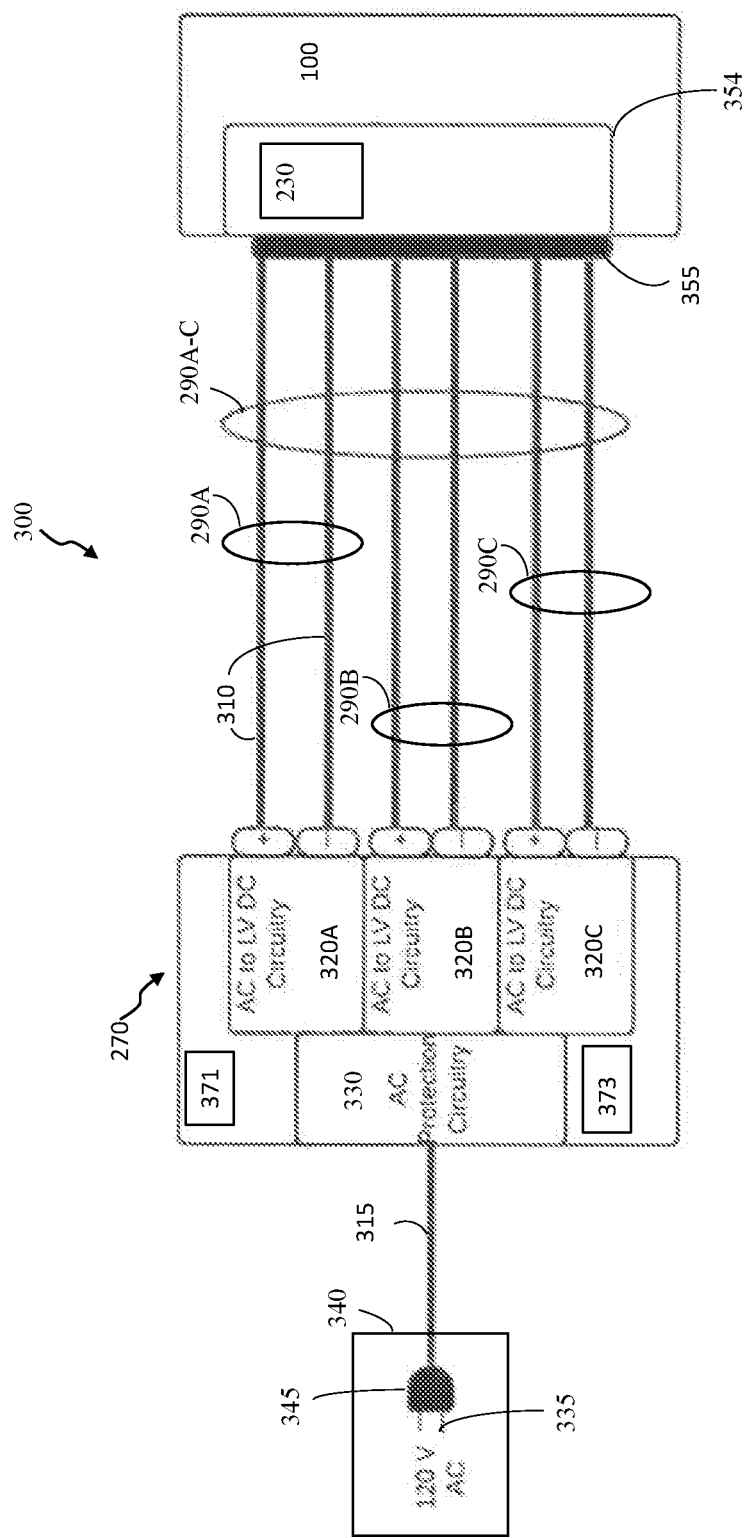
FIG. 3 shows a plurality of outputs of an example external power supply coupled to the movable barrier operator.

FIG. 3 is block diagram of an example movable barrier operator system 300, which may be similar to system 200 of FIG. 2, where the plurality of outputs 290A-C of an external power supply (EPS) 270 are provided to movable barrier operator 100, in accordance with some embodiments. As illustrated, the external power supply 270 may include AC protection circuitry 330 and a cord 315 for connecting to an outlet 340 (e.g., 120 VAC receptacle). In some instances, the cord 315 may be omitted such that the EPS 270 includes a plug 345 and/or receptacle-engaging members 335 (e.g., prongs or blades) for directly coupling the EPS 270 to the outlet 340. The external power supply 270 may also include a plurality of AC to DC circuitry 320A-C, each associated with respective outputs 290A-C. As shown, the outputs 290A-C are configured as pairs of conductors, however additional conductors may be employed. The AC to DC circuitry 320A-C converts the AC input received from the outlet 340 to a DC output for each of the pairs 290A, 290B, 290C of outputs 290A-C. Each of the pairs 290A, 290B, 290C may be bundled together first, and then the outputs 290A-C may be combined within a single jacket. Alternatively, all the outputs 290A-C may be bundled in a single jacket without jacketing each pair 290A, 290B, 290C.

In an embodiment, the external power supply 270 transforms an input power (e.g., a 120 VAC power supply) to a lower voltage and current. In the embodiment of FIG. 3, the external power supply 270 may be installed using an existing 120 VAC outlet 340 within the garage. In contrast, conventional systems would entail installation of a new 120 VAC outlet 340 proximate to the movable barrier operator. Further, each of the plurality of outputs 290A-C of the external power supply 270 have Class 2 output power, and thus can be wired from the external power supply 270 to the movable barrier operator 100 and secured to a garage's interior wall or ceiling.

In this exemplary embodiment, there are three outputs 290A-C. Each output 290A-C includes two wires 310, each wire 310 for providing a positive or negative voltage. In other words, there are three pairs of positive and negative wires. The outputs 290A-C have a Class 2 rating and are combined using combiner circuitry 230 to supply a Class 1 input to the movable barrier operator 100 for supplying power to the motor 110. As noted previously, the combiner circuitry 230 may be a component of the operator 100 or external to the operator 100. In an embodiment, the motor 110 when energized operates at 18 VDC and 15 A (i.e., 270 W), and the NEC Class 2 specification has a 5 A max for a circuit less than 20 VDC. In this instance, according to some embodiments herein, the external power supply 270 would have three outputs 290A-C, each having a 5 A, 18 VDC max rating, where each of the 18 V paired output conductors 290A, 290B, 290C meets the Class 2 definition or specification, and are combined by the combiner circuitry 230 to yield or otherwise form an 18 V, 15A (i.e., 270 W) power source to the motor 110. One of ordinary skill in the art would appreciate that the specific Class, and specifications or requirements associated therewith do not limit the scope of this invention to the exemplary embodiments described herein.

The movable barrier operator 100 may include an interface 354 to which the wires 310 of the outputs 290A-C are connected. For example, the interface 354 may include a block, backplane, or a socket having electrical contacts or terminal connection points. The external power supply 270 may include a connector 355, such as a plug, having the wires 310 secured permanently thereto and electrical contacts in communication with the wires 310. The interface 354 and connector 355 may be shaped so that the interface 354 and connector 355 may be connected together in only one orientation which inhibits miswiring of the system 300. Once the interface 354 and connector 355 are connected together, the electrical contacts thereof are in contact and conduct electricity between the wires 310 and the combiner circuitry 230. In another embodiment, the outputs 290A-C may be coupled to the movable barrier operator 100 via a direct connection to a circuit board of the movable barrier operator 100. In yet another example, the outputs 290A-C may be connected to a terminal block of the movable barrier operator 100.

Figure 4:
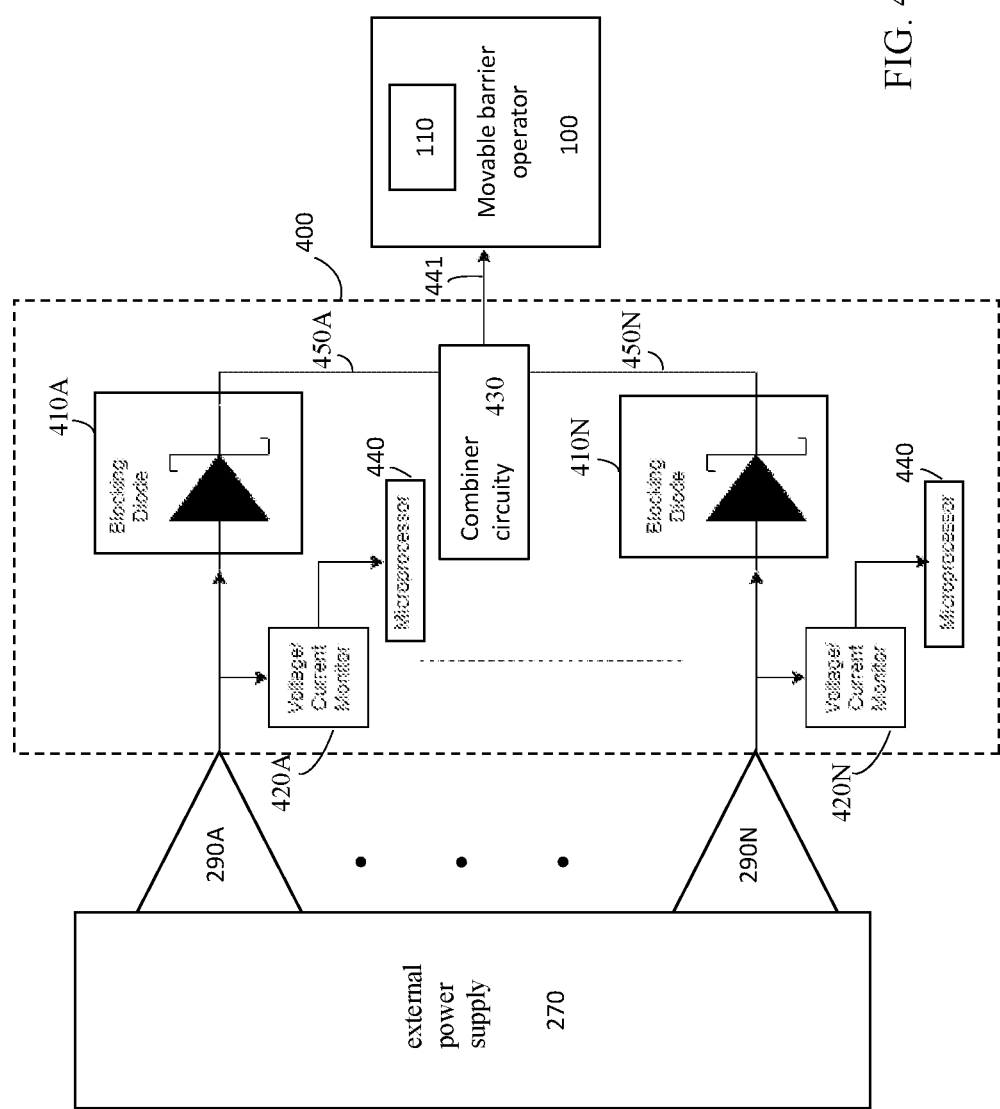
FIG. 4 is a block diagram illustrating an example monitoring circuit of a movable barrier operator.

Regarding FIG. 4, the external power supply 270 provides a monitoring circuit 400 with a N number of inputs, namely outputs 290A-N from the external power supply 270. Each of the outputs 290A-N from the external power supply 270 are coupled to a respective voltage/current monitor 420A-N that determines whether an acceptable current and/or voltage is being supplied by the associated output 290A-N. The voltage/current monitor 420A-N is coupled to a microprocessor 440, which is configured to provide an appropriate alert relating to whether proper or improper function is occurring during installation and/or operation.

In addition, the monitoring circuit 400 includes at least one blocking diode 410A-N associated with each output 290A-N. The blocking diodes 410A-C operate to protect the outputs 290A-N from one another. More particularly, each of the N outputs 290A-N are put through a low voltage drop blocking diode 410 which prevents back-feeding power from one output 290A-N to another. After passing through the diodes 410A-N of the monitoring circuit 400, there are N outputs 450A-N, which are then combined into one combined input 441 by the combiner circuitry 430 to provide power to the operator 100. In an embodiment, the combiner circuitry 430 may be provided within the monitoring circuit 400, as illustrated in FIG. 4. Furthermore, the monitoring circuitry 400 and the combiner circuitry 430 may be configured to be integral, unitary or otherwise within the movable barrier operator 100. The combiner circuitry 430 serves as a point at which all outputs 450A-N recombine to satisfy the power demands of the motor 110 of the operator 100 (e.g., Class 1 VA requirements).

In an embodiment, the outputs 290A-N are monitored individually by the monitoring circuit 400, which sends a level appropriate signal to a microprocessor 440. Microprocessor 440 may be a single microprocessor. In an embodiment, there are a plurality of microprocessors 440, each dedicated to a given output 290A-N. The signal indicates to the microprocessor 440 that an output 290A-N is energized. The microprocessor 440 may be programmed to operate as an AND gate. Specifically, if all N outputs 290A-N have a true reading on them, then the monitoring circuit 400 considers the Class 1 input 441 to be functioning correctly. Microprocessor 440 may be the same as processor 260. Alternatively, microprocessor 440 may be one or more separate processors.

In an embodiment, the monitoring circuit 400 is configured to provide additional fault detection for various movable barrier systems herein. For example, one-way or two-way communication between the monitoring circuit 400 and the external power supply 270 may be facilitated via a communication channel (e.g., LIN, BTLE, Wi-Fi, etc.). In one embodiment, the monitoring circuit 280 is a component of the movable barrier operator 100 and the external power supply 270 includes a microprocessor 371 and communication circuitry 373. The microprocessor 371 may monitor for faults and, in response to a fault, cause the communication circuitry 373 to send a signal to the movable barrier operator 100 indicating the fault. In another approach, the microprocessor 371 may cause the communication circuitry 373 to send periodic signals indicating proper functioning of the external power supply 270. Upon the microprocessor 371 detecting a fault, or upon failure of the external power supply 270, the communication circuitry 373 no longer sends periodic signals indicating proper functioning and the movable barrier operator 100 may determine a fault has occurred.

Further, one or both of the microprocessor 371 and the monitoring circuit 280 cause a boot-up protocol to be performed to check whether all of the outputs of the external power supply are wired correctly. For example, and with reference to FIG. 4, a boot-up protocol may executed by the monitoring circuit 400 wherein the monitoring circuit 400 instructs the external power supply 270 to sequentially test the outputs 290 of the external power supply 270 by energizing the output 290 being tested and deenergizing the outputs not being tested. More specifically, the microprocessor 371 of the external power supply 270 causes the AC to LV DC circuitry 320A to energize the wires 310 of output 290A while deenergizing the AC to LV DC circuitry 320B and 320C. By deenergize, it is intended that the microprocessor 371 may turn off, or keep off, the AC to LV DC circuitry 320B and 320C. If the output 290A is connected properly, only voltage/current monitor 420A should detect a voltage or current of the output 290A.

If an output 290 has an element electrically coupled to one of the other inputs of the combiner circuitry 230, the voltage/current monitor 420 (for example voltage/current monitor 420B) of the other input will detect a voltage or current. The detection of a current, voltage, or power of an output 290 other than the output 290 energized by the microprocessor 371 indicates a fault with the energized output 290. The process of energizing one of the outputs 290 while deenergizing the other outputs 290 may be repeated for the rest of the N number outputs 290 to determine if there are faults with any of the outputs 290. In an embodiment, for each output 290 energized, there may be only one V/A/W detected at the voltage/current monitor 420, such that once all outputs 290 are tested, voltage/current at each voltage/current monitor 420 has been detected only one time. Thus, it may be possible to wire one of the outputs 290A-N to any single input of a voltage/current monitor 420, such that only one of the outputs 290A-N may be wired to any single voltage/current monitor 420 and a single voltage/current monitor 420 has only one of the outputs 290A-N wired to it.

Some embodiments of the boot-up protocol may be executed by a method or computer-based device having stored instructions related to the protocol on a non-transitory computer readable medium having that, when executed by a processor, cause the monitoring circuit 400 to perform the protocol steps.

Figure 5:
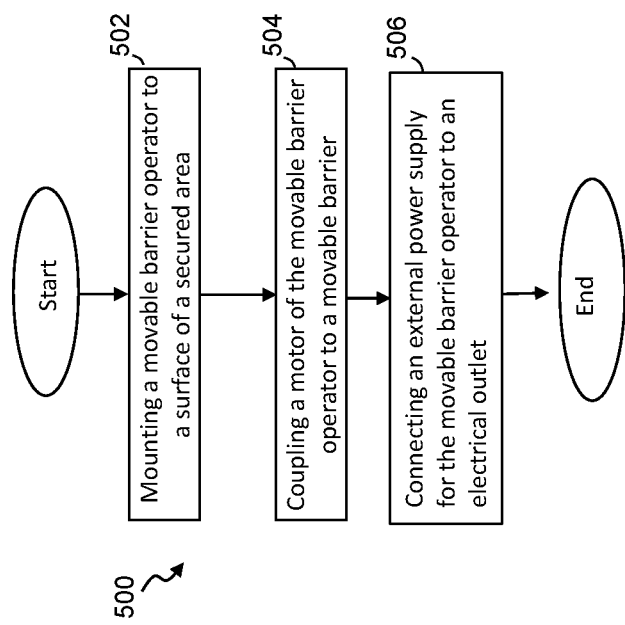
FIG. 5 is a flow chart of an example method of installing a movable barrier system.

Regarding FIG. 5, a method 500 is provided for installing a movable barrier system, in accordance with some embodiments. The method 500 includes mounting 502 a movable barrier operator, such as movable barrier operator 100, to a surface of a secured area. The movable barrier operator has a power rating indicative of a minimum power to be supplied to the movable barrier operator in order for the movable barrier operator to move the movable barrier. Mounting 502 may include mounting the movable barrier operator to a wall or a ceiling of the secured area.

The method 500 includes coupling 504 a motor of the movable barrier operator to a movable barrier. The movable barrier operator may be, for example, a jackshaft operator and coupling 504 includes coupling an output shaft of the movable barrier operator that is driven by the motor to a torsion bar of the movable barrier.

The method 500 includes connecting 506 an external power supply for the movable barrier operator to an electrical outlet. The external power supply includes a plurality of outputs configured to supply electrical power to the movable barrier operator, each of the outputs having a power rating indicative of a maximum power the output provides that is less than the power rating of the movable barrier operator. The connecting 506 may include monitoring whether a fault is present in one or more of the outputs of the external power supply. If no fault is detected, the method 500 may proceed to other installation operations such as setting forces and/or door movement limits. If a fault is detected, the method 500 may further include communicating an alert indicating the fault to a user. Once action is taken by the user responsive to the alert, the system is again monitored and the system checks again to see if a fault is detected. Once no faults are detected, the method 500 may proceed to subsequent installation procedures.

Figure 6:
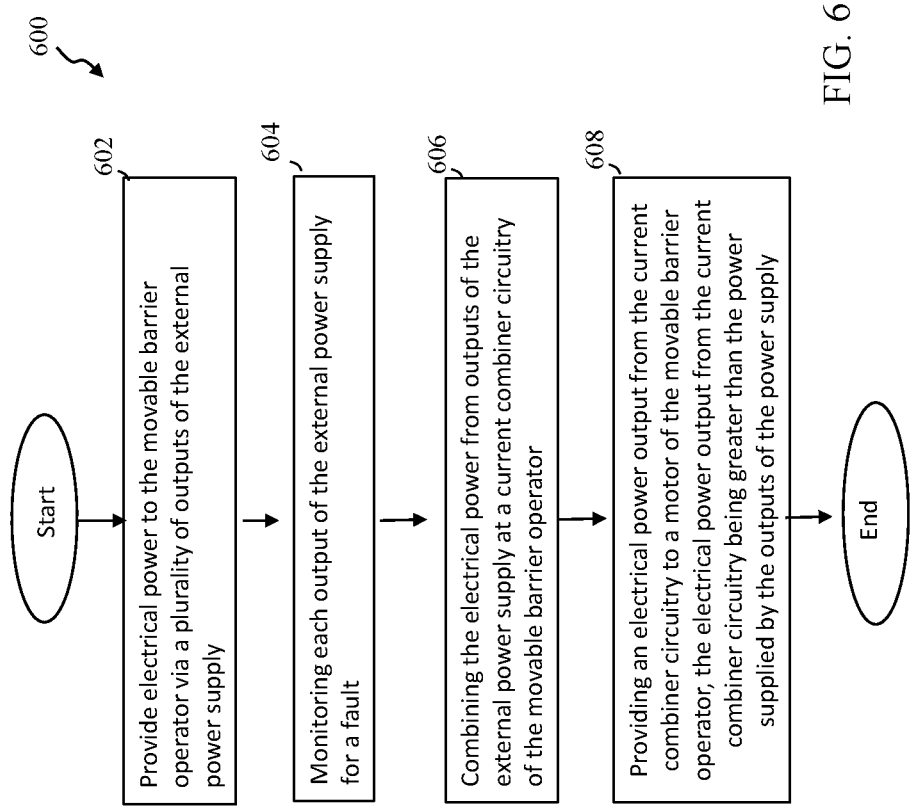
FIG. 6 is a flow chart of an example method of operating a movable barrier system.

Regarding FIG. 6, a method 600 is provided for operating a movable barrier system, in accordance with some embodiments. The method 600 includes providing 602 electrical power to the movable barrier operator via a plurality of outputs of the external power supply and monitoring 604 each output of the external power supply for a fault. If a fault is detected, the method 600 may include communicating an alert to a user device indicating the fault. The alert may include instructions for taking an action or troubleshooting. Alternatively or additionally, the method 602 may include disconnecting the external power supply from the movable barrier operator. A backup battery of the movable barrier operator may then be used to power the movable barrier operator until the fault is remedied.

The method 600 further includes combining 606 the electrical power from the outputs of the external power supply at current combiner circuitry of the movable barrier operator. The method 600 further includes providing 608 an electrical power output from the current combiner circuitry to a motor of the movable barrier operator. The electrical power output from the current combiner circuitry is greater than the power supplied by a single one of the outputs of the power supply.

Figure 7:
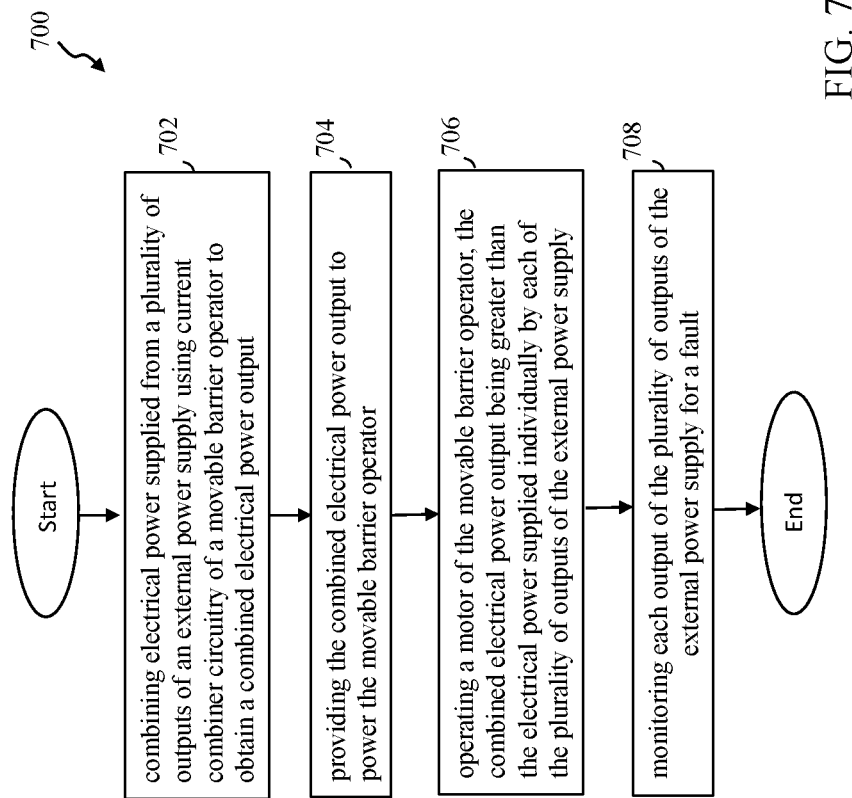
FIG. 7 is a flow chart of another example method of operating a movable barrier system.

Regarding FIG. 7, a method 700 is provided for operating a movable barrier system, in accordance with some embodiments. In an embodiment, the method 700 includes combining 702 electrical power supplied from a plurality of outputs of an external power supply using current combiner circuitry of a movable barrier operator to obtain a combined electrical power output. The method 700 further includes providing 704 the combined electrical power output to power the movable barrier operator. The method 600 further includes operating 706 a motor of the movable barrier operator, the combined electrical power output being greater than the electrical power supplied individually by each of the plurality of outputs of the external power supply. The method 700 further includes monitoring 708 each output of the plurality of outputs of the external power supply for a fault.

In other embodiments, the method includes providing electrical power to the movable barrier operator via a plurality of outputs of the external power supply and monitoring each output of the external power supply for a fault. If a fault is detected, the method may include communicating an alert to a user device indicating the fault. The alert may include instructions for taking an action or troubleshooting. Alternatively or additionally, the method may include disconnecting the external power supply from the movable barrier operator. A backup battery of the movable barrier operator may then be used to power the movable barrier operator until the fault is remedied.

The method further includes combining the electrical power from the outputs of the external power supply at current combiner circuitry of the movable barrier operator. The method further includes providing an electrical power output from the current combiner circuitry to a motor of the movable barrier operator. The electrical power output from the current combiner circuitry is greater than the power supplied by the outputs of the power supply.

In another embodiment, a method of installing a movable barrier operator system is provided. The method comprises: mounting a movable barrier operator to a surface of a secured area; coupling a motor of the movable barrier operator to a movable barrier, the movable barrier operator having a power rating indicative of a minimum power to be supplied to the movable barrier operator in order for the movable barrier operator to move the movable barrier; and connecting an external power supply for the movable barrier operator to an electrical outlet, the external power supply including a plurality of outputs configured to supply electrical power to the movable barrier operator, each of the outputs having a power rating indicative of a maximum power the output provides that is less than the power rating of the movable barrier operator.

In yet another embodiment, the method further comprises connecting wires of the outputs of the external power supply to the movable barrier operator. In an embodiment, the method further comprises coupling a connector of the external power supply to an interface of the movable barrier operator to electrically connect the outputs of the external power source to the movable barrier operator. In an embodiment, the outputs of the external supply include a plurality of wires enclosed in a single jacket. In an embodiment, the method further comprises securing the jacket to a wall of the secured area. In an embodiment, the method further comprises mounting the movable barrier operator to the surface includes mounting the movable barrier operator to the surface at a distance of greater than six feet from the electrical outlet. In an embodiment, the method further comprises connecting the external power supply for the movable barrier operator to the electrical outlet includes connecting a plug of a cord of the external power supply to the electrical outlet, the cord configured to provide AC electrical power to AC-to-DC converter circuitry of the external power supply, the AC-to-DC converter circuitry configured to provide DC electrical power to the outlets of the external power supply.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A movable barrier operator system comprising:
   a motor configured to be coupled to a movable barrier and move the movable barrier between open and closed positions, the motor having a Class 1 motor power rating;
   an external power supply configured to connect to an electrical outlet, the external power supply including a plurality of outputs each having a power rating indicative of a maximum power the output supplies, the power rating of the outputs are all Class 2; and
   a combiner circuitry operatively connected to the plurality of outputs of the external power supply and the motor, the combiner circuitry configured to combine power received from the plurality of outputs of the external power supply and provide the motor with power that was combined from the plurality of outputs of the external power supply.

2. The movable barrier operator system of claim 1, further comprising:
a monitoring circuit operatively connected to the external power supply and configured to detect a fault condition of any of the plurality of outputs of the external power supply.

3. The movable barrier operator system of claim 1, wherein the outputs are combined to supply the Class 1 input to the motor.

4. The movable barrier operator system of claim 1, wherein the plurality of outputs comprises three outputs.

5. The movable barrier operator system of claim 1, wherein the motor is part of a movable barrier operator, and wherein the movable barrier operator further comprises an interface to which the outputs are connected.

6. The movable barrier operator system of claim 5, wherein the external power supply comprises a connector, wherein each output is electrically coupled to the connector through a wire, and wherein the connector is coupled to the interface to electrically couple the external power supply to the motor.

7. The movable barrier operator system of claim 1, further comprising a backup battery.

8. The movable barrier operator system of claim 7, wherein the backup battery is coupled to a battery charger that receives power from the combiner circuitry when the motor is not being operated to charge the backup battery when the backup battery is not fully charged.

9. The movable barrier operator system of claim 8, wherein the battery charger is configured to monitor a status of the backup battery and provide power from the combiner circuitry only when the backup battery is not fully charged.

10. The movable barrier operator system of claim 1, wherein the movable barrier operator system comprises a jackshaft operator.

11. A power delivery system comprising:
a high-power device having a power rating indicative of a minimum power to operate the high-power device;
an external power supply configured to connect to one or more electrical outlets, the external power supply including a plurality of outputs each having a power rating indicative of a maximum power each output supplies;
a combiner circuitry configured to combine power from the plurality of outputs of the external power supply and provide the high-power device with power that at least meets the power rating indicative of the minimum power to operate the high-power device; and
a monitoring circuit configured to detect a plurality of fault conditions of any of the plurality of outputs of the external power supply.

12. The power delivery system of claim 11, wherein the monitoring circuit is configured to detect the plurality of fault conditions, the plurality of fault conditions comprising at least one of:
improper connection of one or more of the plurality of outputs;
excess voltage or current load on one or more of the plurality of outputs;
insufficient voltage or current load on one or more of the plurality of outputs; and
failure of one or more of the plurality of outputs.

13. The power delivery system of claim 11, wherein the power rating of the high-power device is a first power rating and the power rating of the plurality of outputs of the external power supply are a second power rating, and wherein the first and second power ratings are different from one another.

14. The power delivery system of claim 13, wherein the first power rating is greater than the second power rating.

15. The power delivery system of claim 11, wherein the monitoring circuit comprises:
the combiner circuitry;
one or more blocking diodes configured to prevent power from traveling from one output of the plurality of outputs from the external power supply to another output of the plurality of outputs of the external power supply; and
one or more microprocessors coupled to one or more voltage current monitors configured to detect the plurality of fault conditions.

16. The power delivery system of claim 11, wherein the high-power device power rating is Class 1 and the power ratings of the outputs of the external power supply are all Class 2.

17. The power delivery system of claim 11, wherein the monitoring circuit includes a microprocessor configured to:
sequentially test the outputs of the external power supply by energizing the output being tested and deenergizing the outputs not being tested; and
determine a fault condition in response to one of the outputs not being tested providing energy to the combiner circuitry.

18. A power delivery system comprising:
a power supply configured to connect to an electrical outlet, the power supply including a plurality of outputs each having a power rating indicative of a maximum power the output supplies;
a combiner circuitry that combines power from the outputs of the power supply and is configured to provide the combined power to a motor configured to be coupled to a movable barrier to move the movable barrier between open and closed positions, wherein a power rating for each outlet of the power supply is less than a motor power rating of the motor; and
a monitoring circuit configured to detect a fault condition of any of the outputs of the power supply.

19. The power delivery system of claim 18, wherein the motor power rating is Class 1 and the power ratings of the outputs of the power supply are all Class 2.

20. The power delivery system of claim 18, wherein the monitoring circuit is configured to detect the fault condition, the fault condition comprising at least one of:
improper connection of one or more of the plurality of outputs;
excess voltage or current load on one or more of the plurality of outputs;
insufficient voltage or current load on one or more of the plurality of outputs; and
failure of one or more of the plurality of outputs.

* * * * *